United States Patent
Nakakita et al.

(10) Patent No.: US 9,927,824 B2
(45) Date of Patent: Mar. 27, 2018

(54) POWER MANAGEMENT DEVICE AND POWER MANAGEMENT SYSTEM

(71) Applicant: Panasonic Corporation, Kadoma-shi, Osaka (JP)

(72) Inventors: Kenji Nakakita, Osaka (JP); Kiyotaka Takehara, Nara (JP); Yasuhiro Yanagi, Osaka (JP); Hitoshi Nomura, Osaka (JP); Akiko Takamiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 715 days.

(21) Appl. No.: 14/490,708

(22) Filed: Sep. 19, 2014

(65) Prior Publication Data
US 2015/0005978 A1 Jan. 1, 2015

Related U.S. Application Data

(63) Continuation of application No. PCT/JP2013/001338, filed on Mar. 5, 2013.

(30) Foreign Application Priority Data

Mar. 27, 2012 (JP) .................................. 2012-071247

(51) Int. Cl.
H05B 37/02 (2006.01)
H05B 33/08 (2006.01)
(Continued)

(52) U.S. Cl.
CPC .............. G05F 1/66 (2013.01); G05B 15/02 (2013.01); G08C 17/02 (2013.01); H02J 3/14 (2013.01);
(Continued)

(58) Field of Classification Search
CPC ...... G06F 1/3203; G06F 1/266; G06F 1/3287; H02J 3/14; Y02B 60/1282; Y02B 10/72;
(Continued)

(56) References Cited

U.S. PATENT DOCUMENTS 4,510,398 A * 4/1985 Culp .......................... H02J 3/14
307/35
4,916,328 A * 4/1990 Culp, III ................... H02J 3/14
307/39
(Continued)

FOREIGN PATENT DOCUMENTS

JP H03-245743 A 11/1991
JP 2000-137534 A 5/2000
(Continued)

OTHER PUBLICATIONS

Anandalakshmi et al., Flexible power consumption management in smart homes, Aug. 2012, 7 pages.*
(Continued)

*Primary Examiner* — Thuy Dao
(74) *Attorney, Agent, or Firm* — Metrolexis Law Group, PLLC

(57) ABSTRACT

A controller includes a request acquisition unit that receives an operation permission request from a device, a calculation unit that calculates margin electric power derived from measurement by a measurement unit and an upper limit electric power, and a suppression unit that instructs the device to lower electric power consumption. When the margin electric power is less than the required electric power, the controller suppresses electric power consumption in devices in lower priority order stored in a priority storage unit within the suppression unit, such that electric power consumption increase in the management area may remain within the margin electric power. Then the controller issues
(Continued)

the requesting device permission-or-denial for the operation, from the calculation unit.

18 Claims, 3 Drawing Sheets

(51) Int. Cl.
    *H02J 9/06*     (2006.01)
    *G05F 1/66*     (2006.01)
    *H02J 3/14*     (2006.01)
    *H02J 13/00*     (2006.01)
    *G05B 15/02*     (2006.01)
    *G08C 17/02*     (2006.01)

(52) U.S. Cl.
    CPC ..... *H02J 13/0075* (2013.01); *H02J 2003/143* (2013.01); *Y02B 70/3225* (2013.01); *Y02B 70/3266* (2013.01); *Y02B 90/2653* (2013.01); *Y02B 90/2684* (2013.01); *Y04S 20/222* (2013.01); *Y04S 20/242* (2013.01); *Y04S 40/126* (2013.01); *Y04S 40/143* (2013.01)

(58) Field of Classification Search
    CPC ...... G05F 1/66; G05B 15/02; G03G 15/2039; G03G 15/80; H04B 1/3816; H04W 52/36; H05B 37/0272; H05B 37/0227; H05B 37/0281

See application file for complete search history.

(56) References Cited

U.S. PATENT DOCUMENTS

| | | | | |
|---|---|---|---|---|
| 8,039,995 B2* | 10/2011 | Stevens | ............... | H02J 5/005 307/104 |
| 8,165,488 B2* | 4/2012 | Iwata | ............... | G03G 15/80 399/67 |
| 8,306,565 B2* | 11/2012 | Kitaji | ............... | H04W 52/36 455/127.1 |
| 8,764,242 B2* | 7/2014 | Recker | ............... | H02J 7/025 362/276 |
| 8,829,799 B2* | 9/2014 | Recker | ............... | H02J 9/02 315/159 |
| 8,868,935 B2* | 10/2014 | Kim | ............... | G05F 1/66 323/318 |
| 2010/0019574 A1* | 1/2010 | Baldassarre | ............... | H02J 3/14 307/23 |
| 2010/0206869 A1* | 8/2010 | Nelson | ............... | F24D 11/02 219/494 |
| 2011/0270456 A1 | 11/2011 | Kouda et al. | | |
| 2012/0210150 A1* | 8/2012 | de Lind van Wijngaarden | ........ | G06F 1/3212 713/320 |

FOREIGN PATENT DOCUMENTS

| | | |
|---|---|---|
| JP | 2003-209924 A | 7/2003 |
| JP | 2008-099343 A | 4/2008 |
| JP | 2008-182840 A | 8/2008 |
| JP | 2009-165249 A | 7/2009 |
| JP | 2009-273262 A | 11/2009 |
| JP | 2010-193562 A | 9/2010 |
| JP | 2011-205822 A | 10/2011 |
| WO | 2004023624 A1 | 3/2004 |

OTHER PUBLICATIONS

Weiss et al., Increasing energy awareness through web-enabled power outlets, Dec. 2010, 10 pages.*
Lee et al., Monitoring-based temporal prediction of power entities in smart grid cities, Oct. 2012, 5 pages.*
Chinese Office Action dated Feb. 3, 2016 in the counterpart Chinese patent application.
International Search Report for PCT/JP2013/001338 dated Apr. 16, 2013.
Extended European Search Report dated Oct. 14, 2015 in the counterpart EP patent application.

* cited by examiner

POWER MANAGEMENT DEVICE AND POWER MANAGEMENT SYSTEM

CROSS REFERENCE TO RELATED APPLICATIONS

This application is a continuation application of International Application No. PCT/JP2013/001338, filed on Mar. 5, 2013, entitled "POWER MANAGEMENT DEVICE AND POWER MANAGEMENT SYSTEM", which claims priority based on Article 8 of Patent Cooperation Treaty from prior Japanese Patent Applications No. 2012-071247, filed on Mar. 27, 2012, the entire contents of which are incorporated herein by reference.

TECHNICAL FIELD

The invention relates to a power management device and a power management system, which manage electric power used in a management area.

BACKGROUND ART

Conventionally, proposed is a system (autonomous cooperative electric power adjustment mechanism) in which multiple devices in systems of breakers autonomously cooperate to automatically adjust used electric power to not exceed a set electric power capacity (see Document 1: Japanese Patent Application Publication No. 2000-137534).

The system disclosed in Document 1 comprises measuring current used in the system, and communication with multiple devices (device agents). The system has an electric power adjuster, which cooperates with the devices to adjust the use amount of current. The electric power adjuster determines, upon receiving a request for required electric power (request for an increase in electric power) from a device, a possibility of permission depending on whether or not a sum of the present use current and the request current is within a threshold value, and if possible, performs permission for an increase in electric power to the original device of a request source.

In contrast, if the electric power adjuster cannot respond to the request for an increase in electric power, the electric power adjuster requests all the devices to suppress the electric power consumption. In this case, devices capable of suppressing the electric power notify the electric power adjuster of information such as the amount of electric power capable of being suppressed. The electric power adjuster decides, on the basis of the notified information, one or multiple devices to be suppressed, and requests the devices to suppress electric power. The devices that receive the request to suppress electric power perform electric power suppression processing. As soon as the electric power requested from the device is secured, the electric power adjuster performs permission for an increase in electric power to the original device of a request source.

In this way, the electric power adjuster can secure the margin electric power, even if there is no margin electric power (surplus current) for an operation of a given device, by performing suppression processing in accordance with the status and the ability for each device.

Meanwhile, in the system disclosed in Document 1, if the electric power adjuster cannot respond to a request from a given device as described above. The electric power adjuster requests all of the devices to suppress electric power, and determines a device wherein the suppression is performed based on information (possible suppression amount of electric power or the like) notified from the devices in response to the request. In this manner, when securing a margin of electric power ("margin electric power," the electric power adjuster once requests all the devices to suppress electric power. The adjuster selects a device for actual suppression of electric power after receiving information from the respective devices. Accordingly, as the number of devices increase, a longer time for securing the margin electric power is required. Accordingly, the device that requests an increase in electric power might need longer time from issuance of the request until receiving permission for an increase in electric power and starting an operation.

SUMMARY OF INVENTION

An embodiment provides a power management device and a power management system, which can shorten the time securing a margin electric power, if a device requests electric power, by suppressing the electric power consumption in other devices.

An aspect of the invention provides a power management device configured to communicate with devices in a management area, and to communicate with a measurement unit that measures total electric power used within the management area, including: a controller configured to calculate, after receiving a power level request from a power user device, margin electric power that indicates a power margin previously determined from measurement by the measurement unit and from the upper limit electric power, and that permits or denies the request in accordance with a comparison between required electric power necessary for the operation of the requesting device and the margin electric power. The controller is configured to suppress power consumption when the margin electric power is smaller than the requested electric power by transmitting a suppression command to a device with a low priority so that even while allowing operation of the requesting device, the increased amount of electric power within the management area remains within the margin electric power.

With apparatus above, the controller transmits a suppression signal to a device with low priority, and suppresses the electric power consumption. Accordingly, if there is a request for required electric power from a device, the time taken for securing the margin electric power can be advantageously shortened by suppressing the electric power consumption in other devices.

In the power management device, the controller may be configured to issue a permission command to the requesting power user device when the margin electric power is larger than the required electric power.

In the power management device, the controller may be configured to recalculate the margin electric power and issue a suppression command to the requesting power user device in accordance with the recalculation.

In the power management device, the controller may be configured to notify the device of the permission-or-denial including available electric power as an upper limit for the device, when permitting the operation of the device that transmitted the request.

In the power management device, the controller may be configured to issue available electric power information to the requesting power user device, when permitting operation of the requesting power user device.

In the power management device, the controller may be configured to: when the margin electric power is smaller than the required electric power and before suppressing electric power consumption in a power user device, notify the requesting power user device, of available electric power in accordance with the margin electric power including an increased amount due to the suppression of the electric power consumption, and then re-notify the requesting power user device of available electric power according to a recalculated margin electric power, after a set time period following suppression of power consumption in a power user device.

In the power management device, the controller may be configured to set an upper limit to available electric power in accordance with the margin electric power.

In the power management device, the power management device may further comprise an upper limit change unit configured to change the upper limit electric power in response to an outside request.

In the power management device, the controller temporarily allows operation of the requesting power user device in accordance with a margin electric power that is recalculated after raising the upper limit electric power during a set time period, when a lower priority power user device capable of power suppression is absent.

In the power management device, the controller may be configured to release power suppression according to the margin electric power when the device is in electric power consumption suppression and the margin electric power may increase within a predetermined re-notification time from the start of the suppression.

In the power management device, the power management device may further comprise a priority change unit configured to make a device priority highest only during a predetermined time period from notification of permission or denial to the requesting power user device.

In the power management device, the controller may be a processor within an electrical power switch panel.

In the power management device, the controller may be a processor within a personal device assistant.

In the power management device, the controller may be a controller is within a cellular telephone.

Another aspect of the invention provides a power management system that includes: power user devices within a management area; a measurement unit configured to measure electric power used in the management area; and a power management device that can communicate with the measurement unit and with the power user devices. The power management device includes: priority storage that stores priority of the power user devices; and a controller that calculates, upon request from a power user device, margin electric power indicating a margin before the electric power used within the management area reaches an upper limit that is set in advance based on a comparison between measured power by the measurement unit and the upper limit electric power, and notifies the requesting power user device of permission-or-denial for operation according to a comparison between required electric power necessary for the operation of the requesting device and the margin electric power. The controller is configured to suppress electric power consumption by transmitting a suppression signal to a device with lower priority when the margin electric power is smaller than the required electric power to maintain the increased electric power in use in the management area within the margin electric power even when permission is granted to the requesting device.

In the power management system, the measurement unit may be a sensor within an electrical distribution box.

In the power management system, the power user devices may include a heat pump having a continuously adjustable motor that is suppressed by lowering the power use.

In the power management system, the power management device may include a cell phone.

Another aspect of the invention provides a method for managing power consuming devices having rated priority levels within a management area by a controller that communicates power consumption requests and permissions with the devices. A power manager receives total power information within the management area from a measurement unit sensor. The power manager compares total power information with a predetermined upper limit of electric power. The power manager receives power requests from one or more of the power consuming devices. Upon receiving a request from a power consuming device, the power manager determines margin electric power available to meet the request, and instructs a lower priority device to decrease power to allow operation of the requesting power consuming device.

In the method, the lower priority device may be a heat pump with a continuously adjustable compressor motor that is up or down regulated in response to signals from the controller.

EXAMPLES

First Example

Figure 2:
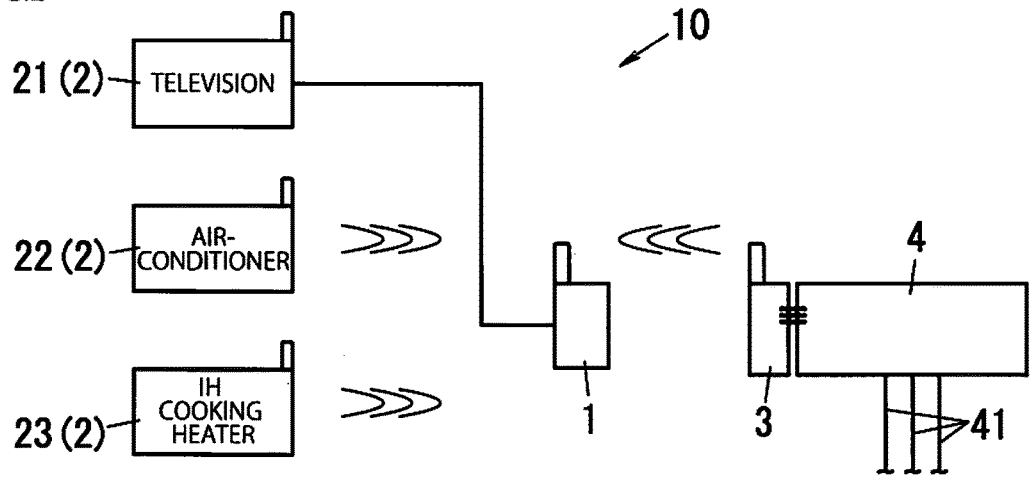
FIG. 2 is a schematic block diagram illustrating a power management system according to the first example.

Power management system 10 in an embodiment is provided with, as illustrated in FIG. 2, multiple devices 2 used in a management area, measurement unit 3, which measures electric power in use in the management area, and power management device 1, which has a function of communicating with measurement unit 3 and multiple devices 2. Hereinafter, an example in which power management system 10 is used in a general single-family house, and the house is in the management area is explained. However, power management system 10 is not limited to use in the single-family house but may be used, for example, in an individual dwelling unit in a collective housing, offices, shops, or the like.

Multiple devices 2 are various kinds of electrical household appliances, facility devices, or the like used in the management area, and include, in an example of FIG. 2, television receiver (hereinafter, referred to as "television") 21, air-conditioner (air conditioning device) 22, and IH cooking heater (hereinafter, referred to as "IH heater") 23. Hereinafter, when television 21, air-conditioner 22, and IH heater 23 are not specially distinguished, these are collectively referred to as "device 2."

In the example of FIG. 2, distribution board 4 connected to an incoming line (not illustrated) of a commercial power supply of a single phase three-wire system is provided in the management area (house). Distribution board 4 is provided with a master breaker (not illustrated) to which the incoming line is connected, and branch breakers (not illustrated) that are branched from a secondary side of the master breaker and are inserted for each of multiple branch systems. The branch systems herein include, in addition to various devices 2 connected to interior wirings 41, wiring accessories such as a plug socket, a wall switch, and the like.

Figure 3:
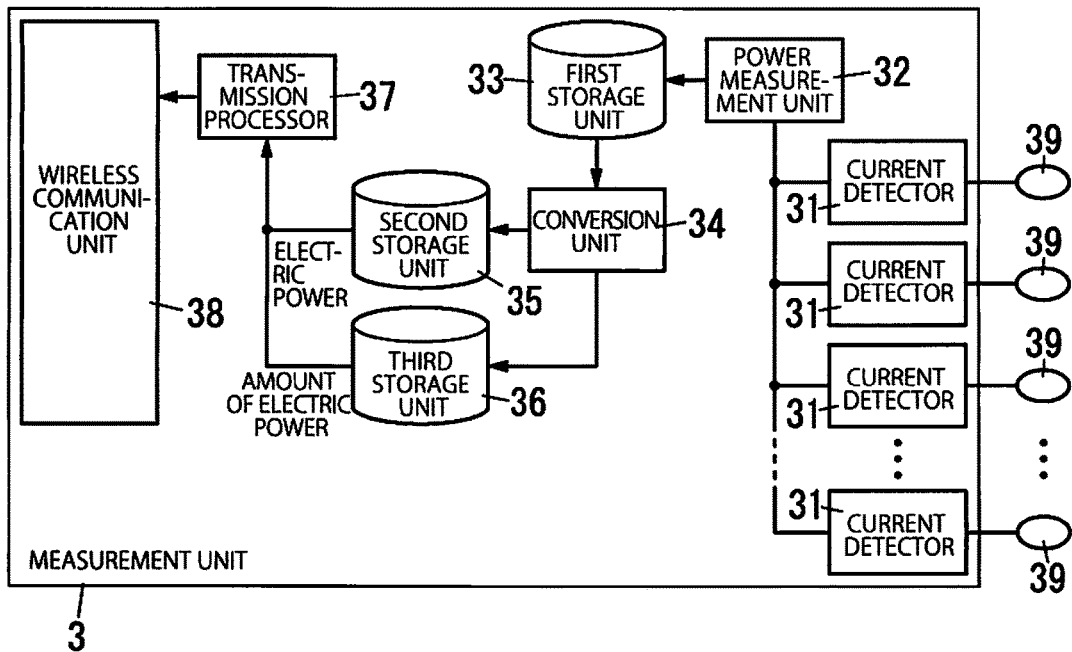
FIG. 3 is a block diagram illustrating a measurement unit according to the first example.

Measurement unit 3 is electrically connected to distribution board 4, measures electric power used in multiple devices 2 for the master system and the respective branch systems, and transmits a result of measurements to power management device 1. Measurement unit 3 includes, as illustrated in FIG. 3, multiple current detectors 31, which detect the current flowing through the master system and the interior wiring 41 (see FIG. 2), a voltage detector (not illustrated) that detects the voltage at interior wiring 41, and power measurement unit 32, which calculates a value of electric power.

In addition, measurement unit 3 includes first storage unit 33, conversion unit 34, second storage unit 35, and third storage unit 36, which are used for processing the result of calculation (value of electric power) by power measurement unit 32, and transmission processor 37 and wireless communication unit 38, which are used for transmitting a result of the measurement to power management device 1. Further, measurement unit 3 includes a microcomputer as a main component, and implements functions of the respective units by executing appropriate programs.

Current detectors 31 are connected to current transformers (CT) 39 respectively provided at measurement points set in predetermined portions for the master system and the respective branch systems in distribution board 4, and detect the current at the measurement points to be detection targets on the basis of the outputs from respective current transformers 39. Here, current detector 31, which includes an A/D converter, samples the magnitude of the current flowing through each measurement point, and outputs a current value as a digital signal to power measurement unit 32. The voltage detector, which connects to the secondary side of the master breaker, for example, in distribution board 4, measures the magnitude of voltage of interior wiring 41, and outputs a voltage value as a digital signal to power measurement unit 32.

Power measurement unit 32 calculates, on the basis of the current value from current detector 31 and the voltage value from the voltage detector, electric power supplied through the measurement point at which current transformer 39 is provided. Here, power measurement unit 32 multiplies the current value from each current detector 31 and the voltage value from the voltage detector to measure values of electric power for the master system and the respective branch systems. Power measurement unit 32 temporarily stores the values of electric power obtained by calculation in first storage unit 33. Conversion unit 34 applies unit conversion and accumulation processing to the values stored in first storage unit 33, and stores the instantaneous electric power in second storage unit 35 and the amount of electric power (accumulated electric power) in third storage unit 36, for the master system and the respective branch systems.

Transmission processor 37 transmits data on the electric power stored in second storage unit 35 and data on the amount of electric power stored in third storage unit 6 to power management device 1 by communication through wireless communication unit 38. Transmission processor 37 transmits the data on a periodic basis, and also transmits the data in response to a request for data transmission from power management device 1.

Wireless communication unit 38 performs bidirectional wireless communication with power management device 1 using radio waves as a transmission medium. Further, the communication between measurement unit 3 and power management device 1 is not limited to wireless communication, but may be wired communication. Moreover, measurement unit 3 and power management device 1 are not limited to be configured to perform direct communication therebetween, but may be configured to communicate with each other via a repeater or the like.

Figure 4:
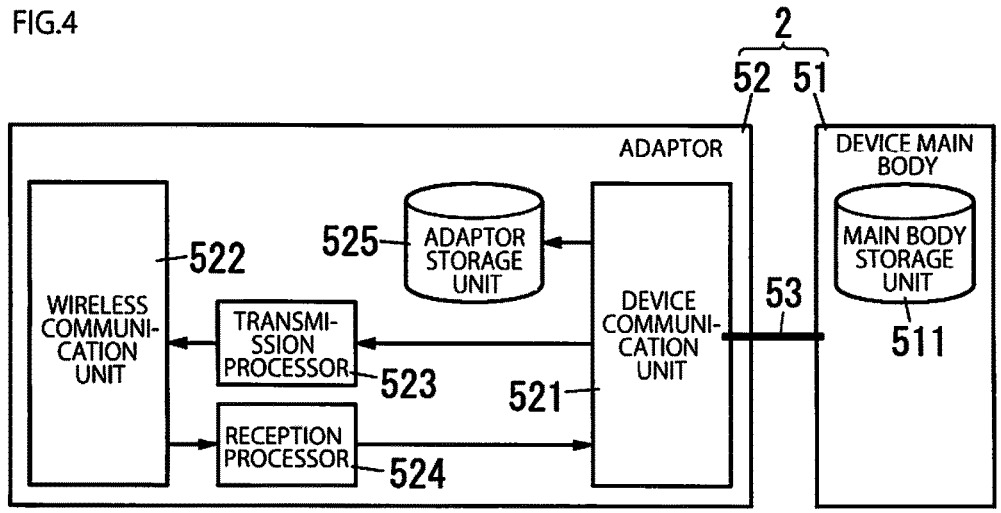
FIG. 4 is a block diagram illustrating a device according to the first example.

Device 2 in the embodiment is provided with, as illustrated in FIG. 4, device main body 51, which has a function as various kinds of devices, such as a television, an air-conditioner, or an IH heater, and adaptor 52 which has a function of communicating with power management device 1. Although adaptor 52 and device main body 51 are included in different housings herein, adaptor 52 may commonly use a housing together with device main body 51. FIG. 4 illustrates IH heater 23, which performs wireless communication with power management device 1 as an example of device 2, and other devices 2 are also configured similarly.

In device 2 illustrated in FIG. 4, device main body 51 and adaptor 52 are connected by a dedicated communication line 53. Device main body 51 includes main body storage unit 511, and stores information necessary for an operation of device 2, characteristic information on device 2, and various kinds of information including information on available electric power, which is described later, in main body storage unit 511. The characteristic information herein includes identification information (for example, a device ID) for identifying device 2, a correspondence relation between the operation of device 2 and the electric power consumption, for example, the electric power consumption in each output (thermal power) switchable in multiple stages when device 2 is IH heater 23.

Adaptor 52 includes device communication unit 521 which performs communication with device main body 51, wireless communication unit 522 which performs communication with power management device 1, transmission processor 523 which performs transmission processing, reception processor 524 which performs reception processing, and adaptor storage unit 525.

Device communication unit 521 performs bidirectional wired communication with device main body 51 using dedicated communication line 53 as a transmission medium. Here, device communication unit 521 acquires characteristic information on device 2 from device main body 51, and stores the characteristic information in adaptor storage unit 525.

Wireless communication unit 522 performs bidirectional wireless communication with power management device 1 using radio waves as a transmission medium. Further, the communication between device 2 and power management device 1 is not limited to the wireless communication, but may be wired communication. For example, television 21 illustrated in FIG. 2 is device 2, which performs wired communication with power management device 1, and thus adaptor 52 includes a wired communication unit in place of wireless communication unit 522. Moreover, device 2 and power management device 1 are not limited to be configured to perform direct communication therebetween, but may be configured to communicate with each other via a repeater or the like.

Transmission processor 523 acquires state change information from device main body 51 through device communication unit 521, when the electric power consumption in device 2 increases by starting an operation or changing an operation state or an operation mode in device main body 51 from user input, for example. In other words, for example, as for device 2 such as air-conditioner 22, the electric power consumption increases when an operation is started or the set temperature is changed, or as for device 2 such as IH heater 23, the electric power consumption increases when an operation is started or the output (thermal power) is raised. Moreover, as for device 2 such as a refrigerator with multiple operation modes, the electric power consumption increases when the operation mode is changed from an energy-saving operation mode to a normal operation mode. Therefore, when such a state change with the increase in electric power consumption occurs, device main body 51 notifies transmission processor 523 of adaptor 52 of information relating to a state change before the state change actually occurs.

Upon being notified of the information relating to the state change from device main body 51, transmission processor 523 refers to characteristic information stored in adaptor storage unit 525, obtains required electric power necessary for an operation of device main body 51 after the state change, transmits a request signal including information on the required electric power to power management device 1. In other words, transmission processor 523 transmits a request signal requesting permission for an operation of device 2 to power management device 1. Specifically, transmission processor 523 obtains, on the basis of the information relating to the state change from device main body 51, the increased amount of electric power consumption in device main body 51 with a shift from a state before the change (for example, device 2 is being stopped) to a state after the change (for example, device 2 is operated at a "thermal power 3"), and sets the increased amount as required electric power. Transmission processor 523 transmits a request signal at least including the obtained required electric power and identification information (for example, device ID) for identifying device 2 through wireless communication unit 522 to power management device 1. Further, device main body 51 may obtain the required electric power.

Reception processor 524 receives permission-or-denial information, which is described later, from power management device 1 in wireless communication unit 522, and notifies device main body 51 through device communication unit 521 of available electric power included in the permission-or-denial information. Here, the available electric power indicates the upper limit electric power available in device main body 51. Device main body 51 stores the acquired available electric power in main body storage unit 511, and operates within the available electric power as the upper limit. Further, because characteristic information including a correspondence relation between the operation and the electric power consumption in device main body 51 is stored in adaptor storage unit 525, reception processor 524 may refer to the characteristic information to convert the available electric power into an instruction for an operation, and notify device main body 51 of the instruction for an operation.

Figure 1:
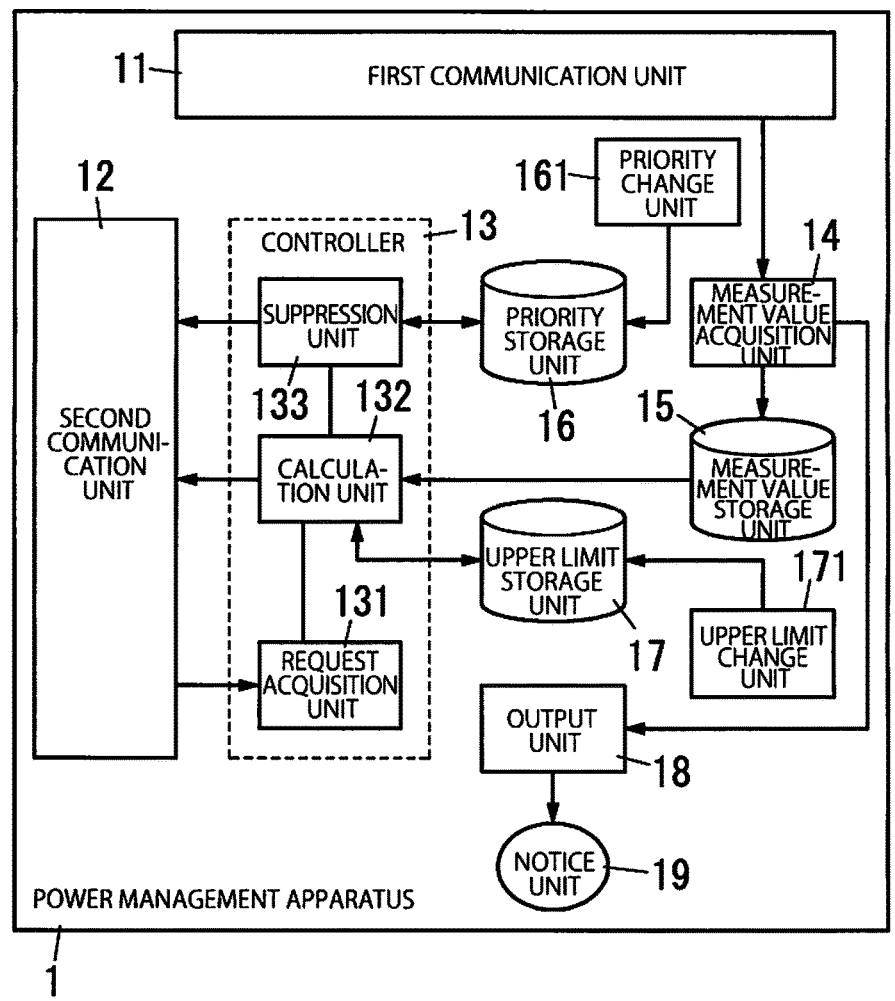
FIG. 1 is a block diagram illustrating a power management device according to a first example.

Meanwhile, power management device 1 includes, as illustrated in FIG. 1, first communication unit 11 that performs communication with measurement unit 3, second communication unit 12 that performs communication with device 2, controller 13, measurement value acquisition unit 14, measurement value storage unit 15, priority storage unit 16, and upper limit storage unit 17. Further, power management device 1 includes a microcomputer as a main component, and implements functions of the respective units by executing appropriate programs.

First communication unit 11 performs bidirectional wireless communication with wireless communication unit 38 of measurement unit 3 using radio waves as a transmission medium. Second communication unit 12 performs bidirectional wireless communication with device 2 using radio waves as a transmission medium. Further, because some device 2 may not correspond to the wireless communication, second communication unit 12 is configured to be able to communicate with device 2 not only by wireless communication but also wired communication.

Measurement value acquisition unit 14 acquires measurement values of instantaneous electric power for the master system and the respective branch systems from measurement unit 3 through first communication unit 11 on a periodic basis (for example, for every one minute), and stores the acquired measurement values for the master system and the respective branch systems in measurement value storage unit 15. Accordingly, in measurement value storage unit 15, for example, as illustrated in table 1 below, the (instantaneous) electric power for each system in which a "system ID", a "circuit name", and "electric power (W)" are in association with one another is housed as electric power information.

TABLE 1

| System ID | Circuit Name | Electric Power (W) |
| --- | --- | --- |
| CO001 | Master (L1 Phase) | 1000 |
| CO002 | Master (L2 Phase) | 500 |
| CO003 | Air-conditioner in Living Room | 300 |
| CO004 | IH Cooking Heater | 200 |
| CO005 | Air-conditioner in Japanese-style Room | 500 |
| CO006 | Kitchen | 200 |
| CO007 | Western-style room on the second floor | 150 |
| CO008 | Bedroom | 150 |

In other words, in the example of table 1, the current electric power consumption in air-conditioner 22 indicated as "Air-conditioner in Living Room" is represented by "300 W", and the current electric power consumption in IH heater 23 indicated as "IH Cooking Heater" is represented by "200 W". The electric power information in measurement value storage unit 15 is updated every time measurement value acquisition unit 14 acquires a measurement value from measurement unit 3, and always indicates the latest information. Further, when only one device 2 is connected to one branch system, the electric power of the branch system is equivalent to the electric power consumption in device 2 connected to the branch system.

Priority storage unit 16 stores therein the priority of multiple devices 2 in advance. The priority herein is a value indicating the relative order of priority in multiple devices 2. The higher priority is set to device 2 to be operated with priority. Priority storage unit 16 stores therein, for example, as illustrated in table 2 below, a priority list in which as for multiple devices 2, each "device ID", each "device name", and each "priority" are in association with one another. Further, in the embodiment, the priority is represented as numerical values such as 1, 2, 3 . . . . The smaller the numerical value is, the higher the priority becomes, and the larger the numerical value is, the lower the priority becomes.

TABLE 2

| device ID | device Name | priority |
|---|---|---|
| DO001 | Master (L1 Phase) | — |
| DO002 | Master (L2 Phase) | — |
| DO003 | Air-conditioner in Living Room | 2 |
| DO004 | IH Cooking Heater | 1 |
| . | . | . |
| . | . | . |
| . | . | . |

In other words, in the example of table 2, while the priority of air-conditioner 22 indicated as "Air-conditioner in Living Room" is "2", the priority of IH heater 23 indicated as "IH Cooking Heater" is "1". Therefore, the example of table 2 represents that the priority of IH heater 23 is higher than that of air-conditioner 22. Accordingly, although details are described later, when air-conditioner 22 and IH heater 23 are intended to be simultaneously operated, IH heater 23 is operated with priority. Further, the device names "Master (L1 Phase)" and "Master (L2 Phase)" in table 2 indicate the master system (L1 phase and L2 phase), and no priority is set to the master system.

A user may set such priority in advance by manipulating a manipulation unit (not illustrated) of power management device 1, or power management device 1 may automatically decide such priority in accordance with the type of device 2. When the priority is decided in accordance with the types of devices, power management device 1 sets the priority such that, for example, as for an IH heater, an air-conditioner, floor heating, a kotatsu, and heat pump type hot water supply equipment, the highest priority is given to the IH heater, and the priority is given so as to be decreased in the order of the air-conditioner, the floor heating, the kotatsu, and the heat pump type hot water supply equipment. When device 2 is newly added, the priority of added device 2 is added to the priority list to update the priority stored in priority storage unit 16.

In addition, the priority is not limited to be set fixedly, but also, for example, may be set changeably in accordance with applicable conditions such as a time band, the season, the weather. In other words, priority storage unit 16 may store therein the priority of multiple devices 2 for each applicable condition as described above, and may change the priority depending on the applicable condition to be applied. Accordingly, for example, priority storage unit 16 can set the priority of the air-conditioner higher than that of the lighting device in time bands during the day, while set the priority of the air-conditioner lower than that of the lighting device in time bands during the night.

Upper limit storage unit 17 stores therein in advance the (instantaneous) electric power that is an upper limit of electric power allowed to be used in the management area as upper limit electric power. The upper limit electric power is set, for example, in accordance with the rated capacity of the master breaker, and may be set for each of L1 phase and L2 phase in the master system.

In addition, in the embodiment, power management device 1 includes output unit 18 and notice unit 19, which give notice in accordance with the measurement value acquired by measurement value acquisition unit 14. Accordingly, for example, the current total use electric power in the management area reaches 90% of the upper limit electric power, output unit 18 can drive notice unit 19 including a buzzer or the like to notify the user that the electric power is excessively used.

Here, controller 13 includes request acquisition unit 131 which acquires a request signal from device 2, calculation unit 132 which calculates margin electric power using data stored in measurement value storage unit 15 and upper limit storage unit 17, and suppression unit 133 which instructs device 2 to suppress the electric power consumption.

When any of multiple devices 2 transmits a request signal requesting permission of the operation, request acquisition unit 131 acquires the request signal through second communication unit 12. In the embodiment, the request signal from device 2 includes identification information (for example, device ID) for identifying device 2 as a transmission source, and information on required electric power necessary for the operation of device 2 as the transmission source. Upon receiving the request signal, request acquisition unit 131 outputs the identification information and the information on the required electric power, which are included in the request signal to calculation unit 132.

Upon receiving the identification information and the information on the required electric power (magnitude) from request acquisition unit 131, calculation unit 132 calculates the current margin electric power on the basis of the measurement value by measurement unit 3 stored in measurement value storage unit 15 and the upper limit electric power stored in upper limit storage unit 17. The margin electric power herein indicates a margin before the total use electric power in the management area reaches the upper limit electric power, and, for example, is represented as a difference between the upper limit electric power and the current total use electric power in the management area (upper limit electric power–total use electric power). As an example, when the upper limit electric power is 3000 W and the electric power information in measurement value storage unit 15 indicates that 1500 W of electric power is in use in the master system as in table 1, the margin electric power of 1500 W (=3000−1500) is obtained.

In addition calculation unit 132 compares the required electric power acquired from request acquisition unit 131 with the calculated margin electric power, and notifies, in accordance with a result of the comparison, device 2 as the transmission source of the request signal through second communication unit 12 of permission-or-denial information indicating permission-or-denial for the operation of device 2 as the transmission source of the request signal. In this case, calculation unit 132 compares the magnitude between the required electric power and the margin electric power, and notifies, if the margin electric power is larger than the required electric power, device 2 as the transmission source of the request signal of permission-or-denial information (hereinafter, referred to as "permission information") indicating that an operation is permitted. In other words, if the margin electric power is larger than the required electric power, calculation unit 132 determines that there is the margin of electric power to allow device 2 as the transmission source of the request signal to be operated, and notifies device 2 of permission information.

In the embodiment, the permission information includes available electric power as an upper limit of available electric power in device 2 as a notification destination (in other words, the transmission source of the request signal). The available electric power may be equivalent to the margin electric power or the required electric power itself, or may be a value of electric power obtained by subtracting a certain value of electric power from the margin electric power. When device 2 having transmitted the request signal receives permission information from power management device 1, device 2 operates within the available electric power included in the permission information as the upper limit.

In contrast, if the margin electric power is smaller than required electric power, calculation unit 132 calculates difference between the required electric power and the surplus electric power (required electric power−surplus electric power) as under electric power, and outputs the magnitude of the under electric power to suppression unit 133. In this case, calculation unit 132 outputs the electric power information stored in measurement value storage unit 15 and identification information for identifying device 2 as the transmission source of the request signal, together with information (magnitude) on the under electric power, to suppression unit 133.

Suppression unit 133 specifies, on the basis of the electric power information from calculation unit 132, devices 2 currently being operated among multiple devices 2 in the management area, and reads out the priority for devices 2 currently being operated and device 2 specified by the identification information from priority storage unit 16. In other words, upon receiving information on the under electric power, suppression unit 133 reads out the priority for devices 2 currently being operated and device 2 as the transmission source of the request signal.

Suppression unit 133 then transmits a suppression signal to device 2 with low priority among devices 2 of which priority is read out through second communication unit 12 to execute suppression control to suppress the electric power consumption in device 2 with low priority. The suppression signal is a control signal to control device 2, which receives the control signal such that the electric power consumption in device 2 is suppressed. Device 2, which receives a suppression signal from power management device 1 suppresses the electric power consumption by stopping (turning off) an operation thereof or changing the operation state or the operation mode. In other words, for example, device 2 being as air-conditioner 22 can suppress the electric power consumption by stopping the operation or changing the set temperature, or device 2 being as IH heater 23 can suppress the electric power consumption by stopping the operation or lowering the output (thermal power). Moreover, device 2 being as a refrigerator with multiple operation modes can suppress the electric power consumption by changing the operation mode from the normal operation mode to the energy-saving operation mode.

Herein, suppression unit 133 can estimate the current electric power consumption in each device 2 by referring to the electric power information from calculation unit 132. Accordingly, when an operation of device 2 is stopped, suppression unit 133 refers to the electric power information to estimate the electric power consumption capable of being suppressed due to the suppression control. Moreover, when changing the operation state or the operation mode, if suppression unit 133 stores therein the electric power consumption capable of being suppressed for each device 2 by changing the operation state or the operation mode as a suppression value table in advance, suppression unit 133 can estimate the electric power consumption capable of being suppressed due to the suppression control by referring the suppression value table. Suppression unit 133 executes the suppression control by transmitting suppression signals to devices 2 in order of lower priority before the total of the electric power consumption to be suppressed reaches the under electric power, such that the suppression of electric power consumption can compensate the under electric power acquired from calculation unit 132.

Suppression unit 133 sends, when the electric power consumption to be suppressed reaches the under electric power due to the suppression control, suppression complete notification to calculation unit 132. Calculation unit 132 which receives the suppression complete notification adds the under electric power to the margin electric power to recalculate margin electric power, compares the recalculated margin electric power (original margin electric power+under electric power) with the required electric power, and notifies, in accordance with a result of the comparison, device 2 as the transmission source of the request signal of permission-or-denial information.

Moreover, when the priority of device 2 as the transmission source of the request signal is lower than the priority of any of other (currently being operated) devices 2, suppression unit 133 executes suppression control such that the electric power consumption in device 2 as the transmission source of the request signal is suppressed. Specifically, controller 13 suppresses the electric power consumption in device 2 as the transmission source of the request signal such that suppression unit 133 notifies device 2 as the transmission source of the request signal through calculation unit 132 and second communication unit 12 of permission-or-denial information (hereinafter, referred to as "non-permission information") indicating that an operation is not permitted. In this case, device 2 as the transmission source of the request signal cannot start the operation because receiving the non-permission information from power management device 1, whereby the electric power consumption in device 2 is suppressed.

Alternatively, controller 13 may suppress the electric power consumption in device 2 as the transmission source of the request signal such that suppression unit 133 notifies calculation unit 132 of the electric power consumption capable of being suppressed as suppression request electric power by changing the operation state or the operation mode of device 2 as the transmission source of the request signal. In this case, controller 13 calculates electric power by calculation unit 132 by subtracting the suppression request electric power from the required electric power (required electric power−suppression request electric power) as available electric power, and notifies device 2 as the transmission source of the request signal through second communication unit 12 of permission information including the available electric power. Accordingly, device 2, which receives the permission information operates within the available electric power smaller than the required electric power that device 2 itself requests as the upper limit, whereby the electric power consumption in device 2 is suppressed.

In this manner, not only a case where the margin electric power is larger than the required electric power but also in a case where the margin electric power is smaller than the required electric power, controller 13 may notify device 2 as the transmission source of the request signal of permission information to permit an operation thereof in some cases by causing device 2 as the transmission source of the request signal to suppress the electric power consumption itself.

In other words, when the margin electric power is smaller than the required electric power, controller 13 performs suppression control that suppression unit 133 suppresses the consumption electric power in devices 2 with low priority, so that even if the operation of device 2 as the transmission source of the request signal is permitted, the increased amount of electric power in use in the management area may remain within the margin electric power. After that, controller 13 performs notification of permission-or-denial information from calculation unit 132 to device 2 as the transmission source of the request signal. Controller 13 is configured to recalculate margin electric power when suppressing the electric power consumption in device 2 by transmitting a suppression signal thereto, and notifying device 2 of permission-or-denial information in accordance with a result of the comparison between margin electric power after the recalculation and the required electric power.

In short, controller 13 performs suppression control such that the increased amount of electric power in use in the management area remains within the margin electric power. The increased amount of electric power in use in the management area is obtained by subtracting the decreased amount of electric power consumption due to the suppression control from the increased amount of electric power consumption in device 2 due to start of an operation of device 2 as the transmission source of the request signal. Controller 13 notifies device 2 of permission-or-denial information after performing such suppression control, so that controller 13 can prevent the electric power in use in the management area from reaching the upper limit electric power even if permitting the operation of device 2 as the transmission source of the request signal. In other words, controller 13 can anticipate that the electric power consumption in device 2 is suppressed due to the suppression control to increase the margin electric power in the management area as a whole, and notify device 2 as the transmission source of the request signal of permission-or-denial information (permission information or non-permission information).

For example, when the priority of IH heater 23 is highest and the priority of television 21 and air-conditioner 22 is decreased in this order, assuming that a request signal is transmitted from IH heater 23 during television 21 and air-conditioner 22 being operated. In this case, suppression unit 133 firstly executes suppression control to suppress the electric power consumption in air-conditioner 22 by transmitting a suppression signal to air-conditioner 22 to change the set temperature. In this case, if the under electric power cannot be compensated only by the suppression control to air-conditioner 22, suppression unit 133 further executes suppression control to suppress the electric power consumption in television 21 by transmitting a suppression signal to television 21 to turn off the power supply. With this control, when the electric power consumption suppressed due to the suppression control reaches the under electric power, controller 13 notifies IH heater 23 of permission information.

Further, controller 13 is not limited to be configured to execute suppression control to devices 2 in ascending order of priority as described above, but may execute suppression control in accordance with the priority including the suppression amount of electric power consumption when the suppression control is executed. For example, when the priority of air-conditioner 22 is higher than that of television 21, if suppression of the electric power consumption in television 21 cannot compensate the under electric power, while suppression of the electric power consumption in air-conditioner 22 can compensate the under electric power, suppression unit 133 executes suppression control to air-conditioner 22.

Moreover, when deciding device 2 of which electric power consumption is to be suppressed, suppression unit 133 may exclude device 2 as a transmission source of a request signal, and determine the priority with respect to only devices 2 currently being operated. This case is equivalent to a case where the priority of device 2 as the transmission source of the request signal is temporarily raised to the highest. Suppression unit 133 executes suppression control to devices 2 excluding device 2 as the transmission source of the request signal, and allocates the margin electric power increased due to the suppression control to device 2 as the transmission source of the request signal.

With power management system 10 of the configuration explained above, power management device 1 centrally manages the electric power in use in the management area, and when receiving a request signal from given device 2, notifies given device 2 of permission-or-denial information. Device 2 starts an operation (state change) after receiving the permission-or-denial information. In other words, before the electric power consumption in device 2 actually increases, power management device 1 determines as to whether or not the total use electric power in the management area exceeds the upper limit electric power due to the increase in the electric power consumption, and if not, power management device 1 permits the operation of device 2. In contrast, if the total use electric power in the management area exceeds the upper limit electric power due to the increase in the electric power consumption, power management device 1 transmits a suppression signal to device 2 with low priority to suppress the electric power consumption, so that the increased amount of electric power in use in the management area may remain within the margin electric power. Therefore, the total use electric power in the management area can be prevented from exceeding the rated range of the master breaker due to the increase in the electric power consumption in device 2 in advance.

In addition, power management device 1 decides device 2 to be a target for suppression control to suppress the electric power consumption in accordance with the priority of devices 2 stored in priority storage unit 16 in advance. Accordingly, power management device 1 is not necessary for communicating with all devices 2 to secure the margin electric power. Therefore, even if the number of devices 2 in the management area is larger, when receiving a request for the required electric power from device 2, power management device 1 can suppress the electric power consumption in other devices 2 to advantageously shorten the time taken for securing the margin electric power. As a result, in device 2, the necessary time from when transmitting a request signal with a manipulation by a user until when receiving notification of permission information is shortened, thereby enabling the time lag after a user manipulates device 2 until device 2 starts an operation to be shortened.

Moreover, when notifying device 2 as the transmission source of the request signal of permission information, power management device 1 causes available electric power to be an upper limit of electric power available in device 2 to include in the permission information. Accordingly, device 2 can operate within the range of the available electric power. In other words, device 2 effectively uses electric power within the range that the total use electric power in the management area does not exceed the upper limit electric power with no electric power to be remained uselessly. Note that, the configuration in which controller 13 causes available electric power to include permission information and notifies device 2 of the permission information is not an essential configuration for power management device 1 in the embodiment, and is possible to be omitted as appropriate. Further, controller 13 may be configured to wait actual suppression of the electric power consumption in device 2 due to suppression control by suppression unit 133, and then notify device 2 as the transmission source of the request signal of permission-or-denial information. In this case, although a slight time lag after a user manipulates device 2 until device 2 starts an operation occurs in device 2, it is possible to sufficiently shorten the time lag, compared with a configuration in which power management device 1 communicate with all devices 2 to secure the margin electric power.

Meanwhile, power management device 1 further includes upper limit change unit 171 which changes the upper limit electric power stored in upper limit storage unit 17 in response to a request from the outside (see FIG. 1). Power management device 1 receives, for example, a peak cut signal transmitted from an electric power company side in order to suppress (peak cut) a peak of energy demand, and upper limit change unit 171 lowers the upper limit electric power on the basis of the peak cut signal. This allows power management device 1 to flexibly change the upper limit electric power in response to the request from the outside, instead of fixing the upper limit electric power. Accordingly, power management device 1 can respond to, for example, a request such as the peak cut described above. Further, upper limit change unit 171 is not an essential configuration for power management device 1 in the embodiment, and is possible to be omitted as appropriate.

Moreover, controller 13 in power management device 1 may be configured to raise the upper limit electric power during only a predetermined allowable period of time and to recalculate margin electric power when the margin electric power is smaller than the required electric power and no device 2 with the electric power consumption capable of being suppressed is present. In this case, controller 13 notifies device 2 as the transmission source of the request signal of permission-or-denial information in accordance with the margin electric power after the recalculation to temporarily allow an operation of device 2. In other words, when the sufficient margin electric power cannot be secured only by suppression of the electric power consumption in device 2, power management device 1 temporarily raises the upper limit electric power to increase the margin electric power, thereby allowing device 2 as the transmission source of the request signal to be operated.

With the configuration, power management device 1 temporarily allows the use of electric power exceeding the upper limit electric power at the normal time to flexibly respond to various use patterns of device 2. For example, when receiving a request signal in which the electric power consumption increases during only a start period after a power supply is turned on from device 2, power management device 1 can notify device 2 of permission information to allow an operation of device 2. Further, the use of electric power exceeding the upper limit electric power at the normal time is allowable during only a limited allowable period of time because the use with the low excess rate and the short period of time does not cause cutout of the master breaker. Note that, the configuration in which controller 13 raises the upper limit electric power during only a predetermined allowable period of time and then recalculates margin electric power is not an essential configuration for power management device 1 in the embodiment, and is possible to be omitted as appropriate.

Moreover, when there is a device 2 in a suppression state of the electric power consumption, controller 13 may be configured to release the suppression state of device 2, if the margin electric power may increase within a predetermined re-notification time from the start of the suppression state of device 2, in accordance with the increased margin electric power. In other words, after controller 13 performs suppression control to given device 2 upon receiving a request signal, if an operation state of device 2 changes due to a manipulation by a user or the like to change the total use electric power in the management area, and to increase the margin electric power until the re-notification time, controller 13 determines as to whether or not it is possible to release the suppression state in accordance with the increased margin electric power. In this case, if the increased amount of electric power consumption due to the release of the suppression state is smaller than the margin electric power, controller 13 transmits a control signal to device 2 in the suppression state to release the suppression state of device 2.

With the configuration, although power management device 1 temporarily suppress the electric power consumption in device 2 by the suppression control, thereafter, if the margin electric power may increase until the re-notification time to allow the suppression state to be released, power management device 1 can release the suppression state. Accordingly, device 2 can further effectively use electric power within the range that the total use electric power in the management area does not exceed the upper limit electric power with no electric power to be remained uselessly. Note that, the configuration in which controller 13 releases the suppression state of device 2 in accordance with the increased margin electric power is not an essential configuration for power management device 1 in the embodiment, and is possible to be omitted as appropriate.

Moreover, power management device 1 further includes priority change unit 161 (see FIG. 1) which sets, when controller 13 notifies device 2 as a transmission source of a request signal of permission information, the priority of device 2 to be the highest during only a predetermined priority period of time from the notification of the permission information. In other words, when notifying air-conditioner 22 of permission information upon receiving a request signal from air-conditioner 22, for example, power management device 1 changes the priority of air-conditioner 22 stored in priority storage unit 16 to be the highest, during only a priority period of time after the notification of the permission information, in priority change unit 161. Further, processing of temporarily changing the priority to be the highest is implemented by assigning a flag in association with corresponding device 2 in priority storage unit 16.

With the configuration, once giving permission information to device 2, power management device 1 can ensure an operation thereof during only a certain period of time (priority time) by causing the priority of device 2 to be the highest. In short, when after given device 2 receives permission information from power management device 1 and starts an operation thereof, another device 2 with the higher priority than that of given device 2 transmits a request signal, the operation of device 2 which has started the operation previously can be prevented from being interrupted. Note that, priority change unit 161 is not an essential configuration for power management device 1 in the embodiment, and is possible to be omitted as appropriate.

Second Example

Power management system 10 in an embodiment is different from power management system 10 in the first example in that controller 13 in power management device 1 performs notification of permission information including the available electric power in the multiple number of times. Hereinafter, common reference numerals are given to the configuration similar to that of the first example, and an explanation thereof is omitted as appropriate.

In the embodiment, when the margin electric power is smaller than the required electric power, before actually transmitting a suppression signal to device 2 to perform suppression control thereto, controller 13 performs primary notification which notifies device 2 as a transmission source of a request signal of the available electric power in accordance with the margin electric power including the increased amount of electric power due to the suppression control. In other words, as the primary notification, controller 13 estimates the suppression amount of electric power consumption due to the suppression control, obtains available electric power in accordance with the margin electric power to which the estimated suppression amount is added, and notifies device 2 of the available electric power.

In addition, controller 13 performs secondary notification, which re-notifies device 2 as the transmission source of the request signal of available electric power in accordance with margin electric power recalculated after a predetermined period of time is elapsed from when actually transmitting a suppression signal to device 2 to perform suppression control thereto. In other words, as the secondary notification, controller 13 measures the actual suppression amount of electric power consumption due to the suppression control, obtains available electric power in accordance with the margin electric power to which the measured suppression amount is added, re-notifies device 2 of the available electric power.

Device 2 as the transmission source of the request signal starts an operation, upon receiving primary notification, within the available electric power included in the primary notification as the upper limit, and upon receiving secondary notification, corrects the available electric power to the available electric power included in the secondary notification, and operates within the available electric power after the correction as the upper limit. Accordingly, if the actual suppression amount of electric power consumption is smaller than the amount expected by the primary notification, the available electric power is corrected to be decreased. In contrast, if the actual suppression amount of electric power consumption is larger than the amount expected by the primary notification, the available electric power is corrected to be increased.

Next, an operation of power management system 10 in the embodiment is explained with reference to FIG. 5. Further, FIG. 5 exemplifies, as devices 2 used in the management area, first air-conditioner 221 indicated by "air-conditioner 1", second air-conditioner 222 indicated by "air-conditioner 2", and IH heater 23.

Figure 5:
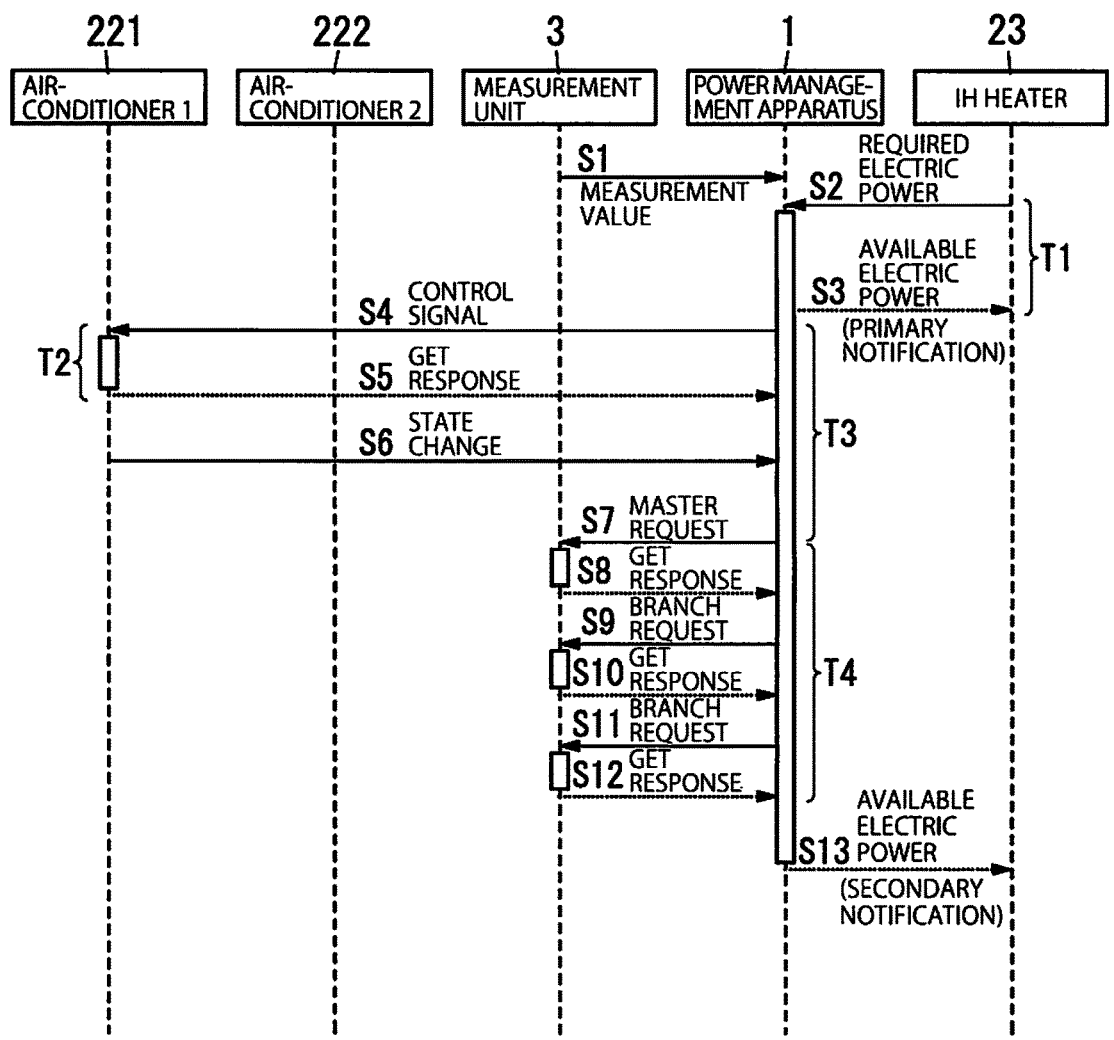
FIG. 5 is a sequence diagram illustrating operation of power management system according to a second example.

Measurement unit 3 notifies on a periodic basis (for example, an interval of one minute) power management device 1 of a measurement value (S1 in FIG. 5).

Upon receiving a request signal including the required electric power from IH heater 23 (S2), power management device 1 specifies a device with low priority (herein, first air-conditioner 221) among devices 2 currently being operated, and estimates margin electric power when executing suppression control to device 2 as a target. Power management device 1 then notifies IH heater 23 of permission information including available electric power in accordance with the estimated margin electric power, as primary notification (S3). IH heater 23, which receives the primary notification starts an operation within the available electric power included in the primary notification as the upper limit. Here, time T1 required for power management device 1 from when receiving a request signal (S2) until issuing primary notification (S3) is within one second, for example.

Power management device 1 which issues the primary notification transmits soon a suppression signal to first air-conditioner 221 (S4), and receives, as a response, a get response transmitted from first air-conditioner 221 (S5), so that power management device 1 determines that first air-conditioner 221 normally receives the suppression signal. Here, the suppression signal is an off-control signal instructing stop of the operation of first air-conditioner 221. Further, time T2 required for power management device 1 from when transmitting a suppression signal (S4) until receiving a get response (S5) is within one second, for example.

Thereafter, first air-conditioner 221 stops an operation in accordance with the off-control signal, and notifies power management device 1 of a state change indicating that the operation is normally stopped (S6). Power management device 1 reads out measurement values from measurement unit 3 (S7 to S12), after predetermined period of time T3 has elapsed from when transmitting the suppression signal (S4). Here, predetermined period of time T3 is preferably set slightly longer than the period of time before the state change (herein, stop of the operation) of the device as a target for suppression control (herein, first air-conditioner 221) has completed. Predetermined period of time T3 is decided in accordance with the number of devices 2 to be a target for suppression control, for example, as follows: "the number of devices 2 to be a target for suppression control×1 second+2 seconds".

Power management device 1 reads out measurement values from measurement unit 3 for each system. In other words, power management device 1 transmits a master request for requesting a measurement value of instantaneous electric power in the master system to measurement unit 3 (S7), and receives a get response as a response thereof (S8), so that power management device 1 acquires the measurement value of instantaneous electric power in the master system. In addition, power management device 1 transmits a branch request for requesting a measurement value of instantaneous electric power in a first branch system to measurement unit 3 (S9), and receives a get response as a response thereof (S10), so that power management device 1 acquires the measurement value of instantaneous electric power in the first branch system. In addition, power management device 1 transmits a branch request for requesting a measurement value of instantaneous electric power in a second branch system to measurement unit 3 (S11), and receives a get response as a response thereof (S12), so that power management device 1 acquires the measurement value of instantaneous electric power in the second branch system. Further, time T4 required for power management device 1 to read out the measurement values from measurement unit 3 (S7 to S12) is within three seconds, for example.

Power management device 1 which reads out the measurement values calculates actual margin electric power from the read measurement values and the upper limit electric power, and notifies IH heater 23 of permission signal including available electric power in accordance with the calculated margin electric power as secondary notification (S13). IH heater 23, which receives the secondary notification corrects the available electric power to the available electric power included in the secondary notification. Further, power management device 1 sets, when the required time from the primary notification to the completion of reading out the measurement values from measurement unit 3 is, for example, approximately six seconds (T3+T4), the time interval between the primary notification and the secondary notification to approximately eight seconds.

With power management system 10 explained above in the embodiment, power management device 1 notifies device 2 of available electric power on the basis of the estimated value as primary notification soon after receiving a request signal. Accordingly, device 2 can start an operation soon in response to the manipulation, so that the instant response property of device 2 can be secured. Moreover, power management device 1 notifies, after a predetermined period of time has elapsed from when performing suppression control, device 2 of available electric power on the basis of the actual measurement value as secondary notification. Accordingly, device 2 can operate within the available electric power on the basis of the actual measurement value as the upper limit, so that device 2 can respond to a shift between the estimated value and the measurement value. In other words, in power management system 10 in the embodiment, while the instant response property of device 2 is secured, device 2 can be operated within the accurate available time in accordance with the actual suppression amount of electric power consumption after the secondary notification as the upper limit.

Meanwhile, in power management system 10 in the embodiment, controller 13 preferably sets, in the primary notification, an upper limit value to the available electric power in accordance with the margin electric power. In other words, controller 13 decides, in the primary notification, the available electric power on the basis of the estimated value of the suppression amount of electric power consumption. Accordingly, there is a possibility that the suppression control to device 2 fails thereafter, and the suppression of the expected electric power consumption cannot be implemented. Therefore, controller 13 sets, by considering that the suppression control fails, an upper limit value to the available electric power notified in the primary notification, for example, such that a value obtained by adding the available electric power to the total use electric power in the management area is 140% of the upper limit electric power.

By setting the upper limit value to the available electric power in the primary notification in this manner, even if controller 13 fails to perform the suppression control, device 2, which receives the primary notification operates within the range of the upper limit value. In short, power management device 1 can control, even if failing to perform the suppression control, the excess rate relative to the upper limit electric power of the total use electric power in the management area to allow the excessive of electric power to remain in the allowable range.

Note that, the configuration in which controller 13 sets an upper limit value to the available electric power in accordance with the margin electric power in the primary notification is not an essential configuration for power management device 1 in the embodiment, and is possible to be omitted as appropriate.

Other configurations and functions are similar to those of the first example.

Moreover, power management device 1 can employ the configuration described in the first example and the configuration described in the second example in combination as appropriate. In other words, power management device 1 in the second example may employ as appropriate the upper limit change unit described in the first example, and the configuration in which controller 13 raises the upper limit electric power during only a predetermined allowable period of time and then recalculates margin electric power. Moreover, power management device 1 in the second example may employ as appropriate the configuration described in the first example in which controller 13 releases the suppression state of device 2 in accordance with the increased margin electric power, and the priority change unit. In addition, power management device 1 may employ as appropriate these configurations in combination.

The invention claimed is:

1. A method for managing power consuming devices having rated priority levels within a management area by a controller that communicates power consumption requests and permissions with the devices, wherein:
 a power manager receives total power information within the management area from a measurement unit sensor;
 the power manager compares total power information with a predetermined upper limit of electric power;
 the power manager receives power requests from one or more of the power consuming devices;
 upon receiving a request from a power consuming device, the power manager determines margin electric power available to meet the request; and
 instructs a lower priority device to decrease power to allow operation of the requesting power consuming device,
 the power manager issues available electric power information to the requesting power user device, when permitting operation of the requesting power user device,
 the power manager, when the margin electric power is smaller than the required electric power and before suppressing electric power consumption in a power user device,
 notify the requesting power user device, of available electric power in accordance with the margin electric power including an increased amount due to the suppression of the electric power consumption, and then
 re-notify the requesting power user device of available electric power according to a recalculated margin electric power, after a set time period following suppression of power consumption in a power user device.

2. The method of claim 1, wherein the lower priority device is a heat pump with a continuously adjustable compressor motor that is up or down regulated in response to signals from the controller.

3. A power management device configured to communicate with devices in a management area, and to communicate with a measurement unit that measures total electric power used within the management area, the power management device comprising:
 a hardware controller configured with a processor that executes a program to perform operations to calculate, after receiving a power level request from a power user device, margin electric power that indicates a power margin previously determined from measurement by the measurement unit and from the upper limit electric power, and that permits or denies the request in accordance with a comparison between required electric power necessary for the operation of the requesting device and the margin electric power,
 wherein:
 the hardware controller is further configured with the program to perform operations to suppress power consumption when the margin electric power is smaller than the requested electric power by transmitting a suppression command to a device with a low priority so that even while allowing operation of the requesting device, the increased amount of electric power within the management area remains within the margin electric power,
 the hardware controller is further configured with the program to perform operations to issue available electric power information to the requesting power user device, when permitting operation of the requesting power user device, and the hardware controller is further configured with the program to perform operations when the margin electric power is smaller than the required electric power and before suppressing electric power consumption in a power user device:
notify the requesting power user device, of available electric power in accordance with the margin electric power including an increased amount due to the suppression of the electric power consumption, and then
re-notify the requesting power user device of available electric power according to a recalculated margin electric power, after a set time period following suppression of power consumption in a power user device.

4. The power management device according to claim 3, wherein the hardware controller is further configured with the program to issue a permission command to the requesting power user device when the margin electric power is larger than the required electric power.

5. The power management device according to claim 3, wherein the hardware controller is further configured with the program to recalculate the margin electric power and issue a suppression command to the requesting power user device in accordance with the recalculation.

6. The power management device according to claim 3, wherein the hardware controller is further configured with the program to notify the device of the permission-or-denial including available electric power as an upper limit for the device, when permitting the operation of the device that transmitted the request.

7. The power management device according to claim 3, wherein the hardware controller is further configured with the program to set an upper limit to available electric power in accordance with the margin electric power.

8. The power management device according to claim 3, wherein the power management device further comprises an upper limit change unit configured to change the upper limit electric power in response to an outside request.

9. The power management device according to claim 3, wherein the hardware controller is further configured with the program to temporarily allow operation of the requesting power user device in accordance with a margin electric power that is recalculated after raising the upper limit electric power during a set time period, when a lower priority power user device capable of power suppression is absent.

10. The power management device according to claim 3, wherein the hardware controller is further configured with the program to release power suppression according to the margin electric power when the device is in electric power consumption suppression and the margin electric power may increase within a predetermined re-notification time from the start of the suppression.

11. The power management device according to claim 3, wherein the power management device further comprises a priority change unit configured to make a device priority highest only during a predetermined time period from notification of permission or denial to the requesting power user device.

12. The power management device of claim 3, wherein the hardware controller comprises the processor within an electrical power switch panel.

13. The power management device of claim 3, wherein the hardware controller comprises the processor within a personal device assistant.

14. The power management device of claim 13, wherein the hardware controller is within a cellular telephone.

15. A power management system, comprising:
power user devices within a management area;
a measurement unit configured to measure electric power used in the management area; and
a power management device that can communicate with the measurement unit and with the power user devices, the power management device comprising:
priority storage that stores priority of the power user devices; and
a hardware controller configured with a processor that executes a program to perform operations to calculate, upon request from a power user device, margin electric power indicating a margin before the electric power used within the management area reaches an upper limit that is set in advance based on a comparison between measured power by the measurement unit and the upper limit electric power, and notifies the requesting power user device of permission-or-denial for operation according to a comparison between required electric power necessary for the operation of the requesting device and the margin electric power,
wherein:
the hardware controller is further configured with the program to suppress electric power consumption by transmitting a suppression signal to a device with lower priority when the margin electric power is smaller than the required electric power to maintain the increased electric power in use in the management area within the margin electric power even when permission is granted to the requesting device,
the hardware controller is further configured with the program to issue available electric power information to the requesting power user device, when permitting operation of the requesting power user device, and
the hardware controller is further configured with the program to, when the margin electric power is smaller than the required electric power and before suppressing electric power consumption in a power user device:
notify the requesting power user device, of available electric power in accordance with the margin electric power including an increased amount due to the suppression of the electric power consumption, and then
re-notify the requesting power user device of available electric power according to a recalculated margin electric power, after a set time period following suppression of power consumption in a power user device.

16. The power management system of claim 15, wherein the measurement unit is a sensor within an electrical distribution box.

17. The power management system of claim 15, wherein the power user devices comprise a heat pump having a continuously adjustable motor that is suppressed by lowering the power use.

18. The power management system of claim 15, wherein the power management device comprises a cell phone.

* * * * *